Oct. 26, 1965    M. W. WINDSOR    3,214,382
PROCESS FOR INCORPORATING PHOSPHORESCENT TRIPLET
STATE ORGANIC COMPOUNDS IN PLASTIC MEDIA
Filed Sept. 26, 1962
*Fig. 1*
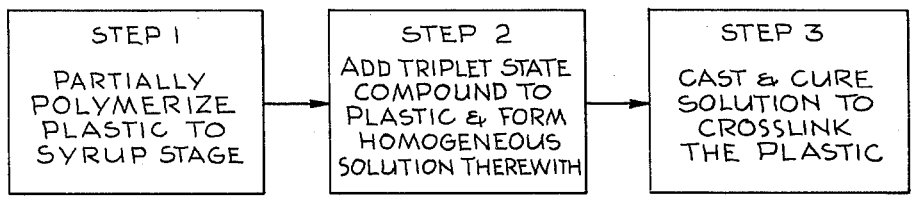
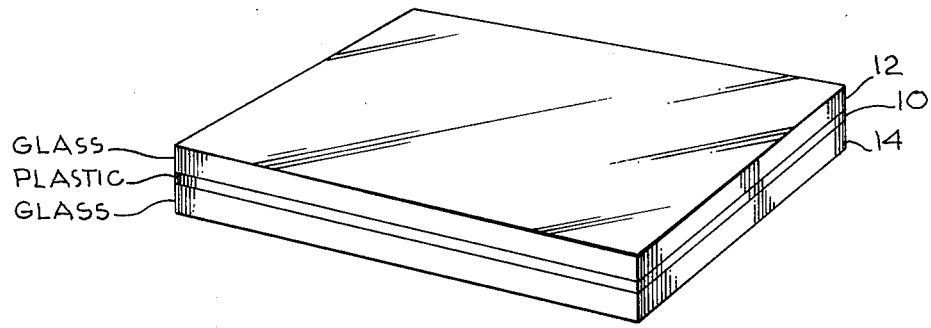
*Fig. 2*
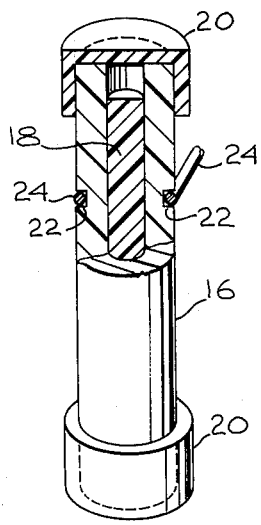
*Fig. 3*
MAURICE W. WINDSOR
INVENTOR.
BY Jerry A. Dinardo
AGENT

United States Patent Office

3,214,382
Patented Oct. 26, 1965

3,214,382
PROCESS FOR INCORPORATING PHOSPHORESCENT TRIPLET STATE ORGANIC COMPOUNDS IN PLASTIC MEDIA
Maurice W. Windsor, Redondo Beach, Calif., assignor, by mesne assignments, to TRW Inc., a corporation of Ohio
Filed Sept. 26, 1962, Ser. No. 226,265
9 Claims. (Cl. 252—301.2)

This invention relates to the production of phosphorescence and photochromism in organic compounds, and more particularly to the provision of plastic media in which such compounds exhibit phosphorescence and photochromism.

Many organic compounds exhibit phosphorescence and photochromism under certain, preferred conditions, e.g., when incorporated into rigid glassy media such as boric acid, sugar, or into frozen solutions at low temperatures (e.g., liquid nitrogen temperature, 77° K.). These organic compounds, which are said to exhibit triplet state effects, will be referred to herein as triplet-state organic compounds. However, these media are not satisfactory for many purposes because of their poor optical quality. For example, both boric acid and sucrose are hygroscopic, i.e., they absorb atmospheric moisture. This leads to opacity of the sample. Also, over long periods of time crystallization may occur with a similar result. Furthermore, such vehicles are not easily worked mechanically. For many purposes a clear plastic medium would be advantageous. However, when incorporated into linear plastics such as polymethylmethacrylate or polystyrene, the above compounds do not exhibit phosphorescence at room temperature.

Accordingly, an object of this invention is to provide plastic media in which organic compounds will exhibit long-lived triplet-state effects, i.e., (1) phosphorescence and (2) photochromism.

Another object is to provide a method of incorporating organic compounds in plastic media in such a way that the compounds exhibit long-lived triplet-state effects.

When these organic compounds are irradiated with light, many of the molecules are raised from the lower singlet or ground state to an upper singlet state. The upper singlet state is an unstable state. Some of the molecules descend to an intermediate state called the lowest triplet state. This intermediate state is metastable and under favorable circumstances can exhibit a long lifetime, often of the order of seconds (almost always in the range of from $10^{-4}$ to $10^{+2}$ seconds). Because of this long life it is often possible to convert temporarily a sizable fraction of the original molecules to the lowest triplet state. If radiation is emitted by molecules making a transition from the lowest triplet state to the ground state, the radiation energy appears as phosphorescence (a long-lived luminescent afterglow). In addition, radiation can be absorbed by molecules in the lowest triplet state, the molecules making a transition to a still higher triplet state. Since this radiation may be different in wavelength from that absorbed by the parent molecule, a photochromic effect may be exhibited.

In attempting to incorporate these compounds in linear plastics, it has been found that the resulting articles do not exhibit phosphorescence or photochromism. It has been determined that the failure to produce phosphorescence and photochromism is due to the inability of the molecules to persist long enough in the lowest triplet state. Furthermore, it has been determined that the lifetime of the molecules in the lowest triplet state can be lengthened by situating them in an environment which is rigid on the molecular scale, so that the molecules are held tightly by their surroundings. While a plastic such as polymethylmethacrylate is macroscopically rigid due to the tangling of the long polymer chains, it is not normally rigid on the microscopic scale.

According to the invention, the long polymer chains of suitable plastics are cross-linked to produce a microscopically rigid environment for the organic compounds, whereby the triplet state lifetime of the organic compounds is sufficiently increased to render them phosphorescent and photochromic at or near room temperatures.

In practicing the method of the invention, a suitable light-transparent plastic forming one constituent is first partially polymerized to the syrup stage. An appropriate triplet-state organic compound forming the other constituent is then added to the partially polymerized plastic syrup and a homogeneous solution is made. The homogeneous solution may then be cast in a suitable mold of desired shape. Thereafter, it is subjected to a curing process to further polymerize and cross link the plastic, the solution solidifying in the desired shape. The cross-linking is carried out to the extent necessary to constrain the molecules of the triplet state compound sufficiently on the microscopic scale to permit them to phosphoresce, but not to the extent of destroying the transparency of the plastic medium.

In the drawing:
FIG. 1 is a flow sheet diagram illustrating the method of the invention;
FIG. 2 is a perspective view showing an article made according to the method of the invention; and
FIG. 3 is a sectional view illustrating an arrangement for casting in cylindrical form a plastic in which a triplet state compound is dissolved in solid solution.

The method of the invention will now be described in conjunction with several examples, reference being had to the flow sheet diagram of FIG. 1 for the order in which the various steps are carried out.

A. Partial polymerization of a monofunctional monomer through the use of a normal polymerization catalyst and heat, and thermal curing through the use of a cross-linking catalyst:

*Example 1*

Step 1.—Methylmethacrylate, a monofunctional monomer selected from the class of polymerizable acrylic compounds, and containing as catalyst about 0.1% benzoyl peroxide, was heated intermittently at about 100° C. for 30 minutes to form a syrup having a room temperature viscosity of about 3 poises, as measured by the Gardner bubble viscometric method. This method is fully disclosed in the journal entitled the "American Society of Testing Materials, Specification No. D 154–56."

Step 2.—To one gram of this partially polymerized syrup was added 3.9 milligrams of picene (triplet state compound selected from the class of aromatic, condensed ring, polynuclear hydrocarbons) and 2.7 milligrams of benzophenone (a cross-linking catalyst).

Step 3.—The viscous solution was then sandwiched between two glass plates and the assembly was heated in an oven for about 18 hours at approximately 150° F. to complete the polymerization. The sample was then removed rom the oven and cooled to room temperature.

When the sandwiched wafer was irradiated with light from a sun lamp emitting ultraviolet and visible light, the color of the wafer in transmission as viewed end-on against a white background was seen to change from water-white to reddish-purple. This phenomenon can be explained as follows. Irradiation by ultraviolet light transfers a sizable fraction of the molecules to the lowest triplet state. The reddish-purple transmitted color arises from the absorption by the triplet state molecules of the blue-green and yellow portions of the visible spectrum and demonstrates the photochromic property of the organic compound. Since transitions from the lowest triplet state take place to higher triplet levels, this type of photochromism is sometimes called triplet-triplet absorption.

When viewed against a black background, a blue emission was observed from the wafer. This is the normal singlet-singlet fluorescence and is detectable only while the exciting light is on. In contrast, the reddish-purple triplet-triplet absorption can be observed for several seconds after the exciting light has been extinguished.

When the lamp was extinguished, the wafer was seen to emit a yellow-green afterglow, indicating phosphorescence of triplet state molecules. These effects were observed at room temperature.

Example 2

*Step 1.*—To 75 milliliters of methylmethacrylate monomer (a monofunctional polymeric acrylic compound) was added 75 milligrams of benzoyl peroxide, and the solution was heated intermittently at about 100° C. for 30 minutes to form a syrup having a hot viscosity of about 6 to 8 poises.

*Step 2.*—To this partially polymerized syrup were added 191 milligrams of benzophenone and 6.4 milligrams of naphthalene (another aromatic, condensed ring, polynuclear hydrocarbon), and a clear homogeneous solution was formed.

*Step 3.*—The viscous solution was then cast in a cylindrical mold. The sample was cured in an oven at 50° C. for 7 days followed by 2 hours at 125° C., and then annealed to room temperature. When exposed to a sunlamp, the cylindrical sample exhibited blue-green phosphorescence at room temperature.

Example 3

To 2 grams of polymethylmethacrylate syrup prepared as in Example 2, Step 2, were added 5 milligrams of chrysene (a condensed ring, polynuclear, aromatic hydrocarbon) and 12 milligrams of benzophenone (a cross-linking catalyst). The mixture was stirred to form a homogeneous solution and placed in a 50 milliliter beaker. The sample was polymerized in an oven for 19 hours at 49° C. followed by 9 hours at 65° C. The finished sample was a clear solid, slightly yellow in color with a few small bubbles. When exposed to a sunlamp, at room temperature, the sample developed a reddish-purple color owing to triplet-triplet absorption. On extinguishing the sunlamp, a strong green phosphorescence was seen.

B. Partial polymerization of a polyfunctional monomer through the use of a normal polymerization catalyst and heat, and thermal curing without the use of a cross-linking catalyst:

Example 1

*Step 1.*—750 milligrams of benzoyl peroxide (a normal polymerization catalyst) were dissolved in 25 milliliters of allyl diglycol carbonate monomer (a difunctional polymeric allylic compound) and the solution was heated intermittently at about 100 to 160° C. for 30 minutes to form a syrup having a hot viscosity of about 6 poises.

*Step 2.*—To this partially polymerized syrup were added 20 milligrams of picene. The consitutents were dissolved by stirring to form a clear homogeneous solution.

*Step 3.*—The viscous solution was then sandwiched between two glass plates and the sample was cured in an oven at 80° C. for 28 hours followed by two hours at 120° C. The sample was then cooled to room temperature. When the sandwiched wafer was exposed to a sunlamp, it exhibited a green phosphorescence.

C. Partial polymerization of polyfunctional monomer through the use of a normal polymerization catalyst and heat, and thermal curing through the use of a cross-linking catalyst:

Example 1

*Step 1.*—To 50 milliliters of allyl diglycol carbonate monomer were added about 2.5 milligrams (approximately 5% by weight) of benzoyl peroxide, and the solution was heated at about 100 to 140° C. for 30 minutes to form a syrup having a hot viscosity of about 6 poises.

*Step 2.*—To this partially polymerized syrup were added 191 milligrams (approximately 0.4% by weight) of benzophenone cross-linking catalyst and 6.4 milligrams of naphthalene and a clear homogeneous solution was formed.

*Step 3.*—The viscous solution was then cast in a cylindrical mold which was closed to prevent the continued entry of oxygen into the solution. It has been found that the excess oxygen entry into the closed sample destroys its phosphorescent properties. The sample was cured in an oven at 70° C. for 64 hours and then at 130° C. for 24 hours. The sample was then annealed by cooling slowly to room temperature over 12 hours. When exposed to a sunlamp, the cylindrical sample exhibited blue-green phosphorescence at 0° C. and 77° K.

Example 2

*Step 1.*—To 50 milliliters of allyl diglycol carbonate monomer were added about 2.5 grams of benzoyl peroxide, and the solution was heated intermittently at about 100 to 140° C. for 30 minutes to form a syrup having a cold viscosity of about 3 to 4 poises.

*Step 2.*—To this partially polymerized syrup were added 91 milligrams of benzophenone and 6 milligrams of naphthalene, and a clear homogeneous solution was formed.

*Step 3.*—The viscous solution was then cast in a cylindrical mold and cured in an oven at 88° C. for 36 hours followed by 24 hours at 130° C., and then annealed to room temperature. When exposed to a sunlamp, the cylindrical sample exhibited blue-green phosphorescence at 0° C. and 77° K.

In practicing the method of the invention, it will be found desirable to exercise some degree of control over several of the parameters involved. In the first place, it is important to control the viscosity of the partially polymerized syrup. The number of cross-linking sites activated is a function of the rapidity of attainment of the high viscosity. Thus, to insure the establishment of a sufficient number of cross-linking sites which will in the curing process result in a sufficiently high degree of cross-linking, it is important that the partial polymerization step be carried out rapidly, i.e., by subjecting the monomer to as high a temperature as is practicable for a period of time sufficient for the plastic to reach the viscous state. In the examples described, a viscosity of 1 to 8 poises is preferably attained. If the viscosity is much higher than this, the homogeneous incorporation of the triplet state compound becomes more difficult. Satisfactory results will be obtained if the viscosity is maintained in the range of 1 to 8 poises.

In addition, it is necessary to limit the maximum concentration of the triplet state compound to that amount which will not exceed its solubility in the plastic medium used. Otherwise, a suspension will form instead of a true solution. Further, the temperature at which the initial stages of the thermal curing is carried out must be low enough to prevent both the growth of the polymerization exotherm and the decomposition of any unstable triplet state compound used. If the polymerization exotherm of the polymerization reaction is permitted to become self-sustaining, it is found that the solution will tend to bubble thereby causing the product to be filled with voids. Therefore, it has been found practicable to carry out the initial stages of the curing process at a mild temperature over a long period of time to cause sufficient solidification of the solution to be achieved, so that bubbling can not thereafter occur. Then the solidified solution can be safely heated to a higher temperature to produce sufficient cross-linking in the plastic to hold the triplet state molecules rigid. However, the degree of cross-linking must not be so high as to produce opaqueness in the plastic medium. It has been found that satisfactory results will be attained if the cross-linking is held to levels as represented by 50% to 75% gel content in the finished product. The gel content is determined by measuring the weight percent of plastic dissolved after 5 hours immersion in refluxing toluene.

FIG. 2 shows one form of a device incorporating a triplet state organic compound in solid solution with a clear plastic. In this embodiment the organic compound is combined with plastic in the form of a thin solid sheet 10 sealed between two glass plates 12 and 14. Such a device may serve as a phosphorescent window, the two glass plates 12 and 14 serving as protection for the plastic sheet 10 when used in environments where mechanical or chemical damage might otherwise ensue.

For use in environments where no protective elements are needed, the plastic may be cast in any desired shape. In FIG. 3, for example, the solution containing the partially polymerized plastic and the triplet state organic compound may be poured into a mold 16, shown as being cylindrical in form. The solution is then cured in the mold 16 in the manner described above to form a plastic rod 18. Advantageously, the mold 16 is fabricated from a material that is not wettable by the plastic, such as Teflon (polytetrafluorethylene), so that the plastic rod 18 is readily removable from the mold 16 after curing.

In the example shown, the mold 16 is provided with tight fitting closure caps 20 at both ends, which are removed after curing to permit the plastic rod to be pushed out of the mold 16. The mold 16 is also provided with notches 22 to accommodate support members 24 which hold the mold 16 vertically.

The embodiments of the invention in which an exclusive property or privilege is claimed are defined as follows:

1. The method of manufacturing an article consisting essentially of a triplet state organic compound in solid solution with a transparent cross-linked plastic, said method comprising:

partially polymerizing a monomer of an alkyl methacrylate plastic to a syrup, introducing a triplet state organic compound into said syrup to form a homogeneous solution, and curing said solution to further polymerize and cross-link said plastic to a degree below that which causes said plastic to lose its transparency, said triplet state compound being an aromatic, condensed ring, polynuclear hydrocarbon exhibiting triplet state effect in combination with said cross-linked plastic.

2. The invention according to claim 1, wherein said monomer is polymerized to a syrup having a viscosity in the range of about one to eight poises.

3. The invention according to claim 1, wherein said curing step is carried out to cross-link said plastic to a level represented by 50 to 75% gel content in the finished article.

4. The invention according to claim 1 wherein said monomer is partially polymerized at a relatively rapid rate, and said solution is cured first at a relatively slow rate and then at a relatively rapid rate.

5. The invention according to claim 4, wherein said plastic monomer consists essentially of a material selected from the group consisting of methylmethacrylate and allyl diglycol carbonate.

6. The invention according to claim 5, wherein said triplet state compound is a material selected from the group consisting of picene, chrysene, and naphthalene.

7. The invention according to claim 1, wherein said monomer is partially polymerized by adding a catalyst thereto and rapidly heating said catalyst and monomer.

8. The invention according to claim 7, wherein said homogeneous solution is cured by adding a catalyst thereto and heating said solution and catalyst first at a relatively slow rate and then at a relatively rapid rate.

9. The invention according to claim 8, wherein said monomer is partially polymerized to a syrup having a viscosity in the range of about one to eight poises, and said homogeneous solution is cured to cross-link said plastic to a level represented by about 50 to 75% gel content in the finished article.

References Cited by the Examiner
UNITED STATES PATENTS 2,650,309   8/53   Webb et al. _____ 252—301.3 X TOBIAS E. LEVOW, *Primary Examiner.*

MAURICE A. BRINDISI, *Examiner.*